(12) United States Patent
Vijayan et al.

(10) Patent No.: US 10,897,153 B2
(45) Date of Patent: *Jan. 19, 2021

(54) SYSTEM AND METHOD FOR CHARGING RECEIVER DEVICES

(71) Applicant: General Electric Company, Schenectady, NY (US)

(72) Inventors: Pradeep Vijayan, Karnataka (IN); Somakumar Ramachandrapanicker, Karnataka (IN); Deepak Aravind, Bangalore (IN); Arun Kumar Raghunathan, Karnataka (IN); Vishnu Mahadeva Iyer, Raleigh, NC (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,067

(22) Filed: Aug. 3, 2017

(65) Prior Publication Data
US 2018/0041066 A1 Feb. 8, 2018

(30) Foreign Application Priority Data
Aug. 4, 2016 (IN) .............................. 201641026650

(51) Int. Cl.
*H02J 7/02* (2016.01)
*H01F 27/28* (2006.01)
(Continued)

(52) U.S. Cl.
CPC .............. *H02J 7/025* (2013.01); *H01F 27/28* (2013.01); *H01F 38/14* (2013.01); *H02J 50/12* (2016.02); *H02J 50/40* (2016.02)

(58) Field of Classification Search
CPC . H02J 7/025; H02J 50/12; H02J 50/40; H01F 38/14; H01F 27/28
(Continued)

(56) References Cited

U.S. PATENT DOCUMENTS

| 3,950,691 A * | 4/1976 | Ohba ................ H02M 7/53806 363/56.07 |
| 6,643,156 B2 * | 11/2003 | Zubieta ............. H02M 7/53871 363/132 |

(Continued)

FOREIGN PATENT DOCUMENTS

| WO | 2006001557 | 1/2006 |
| WO | 2012091209 | 7/2012 |

OTHER PUBLICATIONS

Vijayan, P., System and method for charging receiver devices, GE co-pending Application No. 201641026649, filed Aug. 4, 2016.
(Continued)

*Primary Examiner* — M Baye Diao
(74) *Attorney, Agent, or Firm* — DeLizio Law, PLLC

(57) ABSTRACT

A charging pad for charging one or more receiver devices is disclosed. The charging pad includes at least one first resonator coil operable at a first frequency band and at least one second resonator coil operable at a second frequency band. Further, the charging pad includes at least one exciter coil magnetically coupled to the at least one first resonator coil and the at least one second resonator coil. In addition, the charging pad includes an excitation unit operationally coupled to the at least one exciter coil and configured to drive the at least one first resonator coil and the at least one second resonator coil via the at least one exciter coil.

19 Claims, 7 Drawing Sheets

(51) Int. Cl.
*H01F 38/14* (2006.01)
*H02J 50/12* (2016.01)
*H02J 50/40* (2016.01)

(58) Field of Classification Search
USPC .................................................. 320/108
See application file for complete search history.

(56) References Cited

U.S. PATENT DOCUMENTS

| | | | | |
|---|---|---|---|---|
| 7,221,107 | B2* | 5/2007 | Melis | H05B 41/2888 |
| | | | | 315/209 R |
| 7,414,404 | B2* | 8/2008 | Keene | G01V 3/107 |
| | | | | 324/329 |
| 9,018,900 | B2 | 4/2015 | Yamamoto et al. | |
| 9,107,280 | B2* | 8/2015 | Hishikawa | H01J 35/10 |
| 9,124,113 | B2 | 9/2015 | Hu et al. | |
| 9,143,000 | B2 | 9/2015 | Leabman et al. | |
| 9,153,998 | B2 | 10/2015 | Mayo | |
| 9,343,922 | B2* | 5/2016 | McCauley | H02J 7/025 |
| 9,525,302 | B2* | 12/2016 | Throngnumchai | B60L 53/38 |
| 9,643,505 | B2* | 5/2017 | Ichikawa | H02J 50/90 |
| 9,653,948 | B2* | 5/2017 | Polu | H02J 50/40 |
| 9,837,830 | B2* | 12/2017 | Yun | H02J 5/005 |
| 9,912,166 | B2* | 3/2018 | Baarman | H02J 50/60 |
| 9,941,753 | B2* | 4/2018 | Asanuma | H02J 50/90 |
| 10,097,052 | B2* | 10/2018 | Uramoto | H02J 50/12 |
| 10,411,522 | B2* | 9/2019 | Ichikawa | H02J 7/025 |
| 2007/0182367 | A1 | 8/2007 | Partovi | |
| 2010/0187913 | A1 | 7/2010 | Smith et al. | |
| 2011/0074346 | A1* | 3/2011 | Hall | B60L 53/126 |
| | | | | 320/108 |
| 2011/0181205 | A1 | 7/2011 | Chung | |
| 2012/0248889 | A1* | 10/2012 | Fukushi | H02J 50/12 |
| | | | | 307/104 |
| 2013/0127253 | A1* | 5/2013 | Stark | A61N 1/3787 |
| | | | | 307/104 |
| 2013/0300355 | A1 | 11/2013 | Jung | |
| 2014/0015480 | A1* | 1/2014 | Cheikh | H04B 5/0037 |
| | | | | 320/108 |
| 2015/0008767 | A1* | 1/2015 | Shinoda | H01F 38/14 |
| | | | | 307/149 |
| 2015/0077053 | A1 | 3/2015 | Stamenic et al. | |
| 2015/0145529 | A1* | 5/2015 | Urano | H01F 38/14 |
| | | | | 324/655 |
| 2015/0229157 | A1* | 8/2015 | Lin | H02J 7/0044 |
| | | | | 320/108 |
| 2015/0333530 | A1 | 11/2015 | Moyer et al. | |
| 2015/0349541 | A1* | 12/2015 | Yamamoto | G01V 3/10 |
| | | | | 307/104 |
| 2015/0349542 | A1* | 12/2015 | Yamamoto | H02J 50/40 |
| | | | | 307/104 |
| 2016/0096435 | A1* | 4/2016 | Lee | B60L 11/182 |
| | | | | 307/10.1 |
| 2016/0126744 | A1* | 5/2016 | Jeong | H02J 17/00 |
| | | | | 307/104 |
| 2016/0164303 | A1 | 6/2016 | Ku et al. | |
| 2016/0211702 | A1 | 7/2016 | Muratov et al. | |
| 2016/0226298 | A1 | 8/2016 | Shimokawa et al. | |
| 2017/0018937 | A1 | 1/2017 | Muratov | |
| 2017/0047785 | A1* | 2/2017 | Twelker | G06F 1/1633 |
| 2017/0179772 | A1* | 6/2017 | Asanuma | H02J 17/00 |
| 2018/0041065 | A1* | 2/2018 | Vijayan | H02J 50/10 |
| 2018/0226835 | A1* | 8/2018 | Baarman | H02J 5/005 |

OTHER PUBLICATIONS

Extended European Search Report and Opinion issued in connection with corresponding EP Application No. 17181476.7 dated Dec. 12, 2017.
"European Application No. 17181476.7 Communication pursuant to Article 94(3) EPC", Feb. 21, 2019, 5 pages.
"Qi System Description Wireless Power Transfer", Wireless Power Consortium, vol. 1:Low Power, Part 1:Interface Definition, Version 1.0.1, Oct. 2010, 88 pages.
"U.S. Appl. No. 15/667,444 Office Action", dated May 15, 2019, 15 pages.
Ahn, et al., "Wireless Power Transfer With Concurrent 200 KHZ and 6.78 MHZ Operation in a Single Transmitter Device", Power Electronics, IEEE Transactions on, Volume: PP, Issue: 99, Sep. 18, 2015, 13 pages.
aH01, et al., "Design of High Efficiency Wireless Charging Pad Based on Magnetic Resonance Coupling", Radar Conference (EuRAD), 2012 9th European, pp. 590-593, Oct. 31, 2012-Nov. 2, 2012, Amsterdam, 2012, 4 pages.
"India Application No. 201641026649 First Examination Report", dated Aug. 28, 2019, 8 pages.
"The Qi Wireless Power Transfer Power Class 0 Specification", Qi Wireless Power Consortium, Parts 1 and 2: Interface Definitions, Version 1.2.2, Apr. 2016, 160 pages.
"The Qi Wireless Power Transfer Power Class 0 Specification", Qi Wireless Power Consortium, Part I: Reference Designs, Version 1.2.2, Apr. 2016, 309 pages.
"India Application No. 201641026650 First Examination Report", dated Oct. 3, 2019, 4 pages.

\* cited by examiner

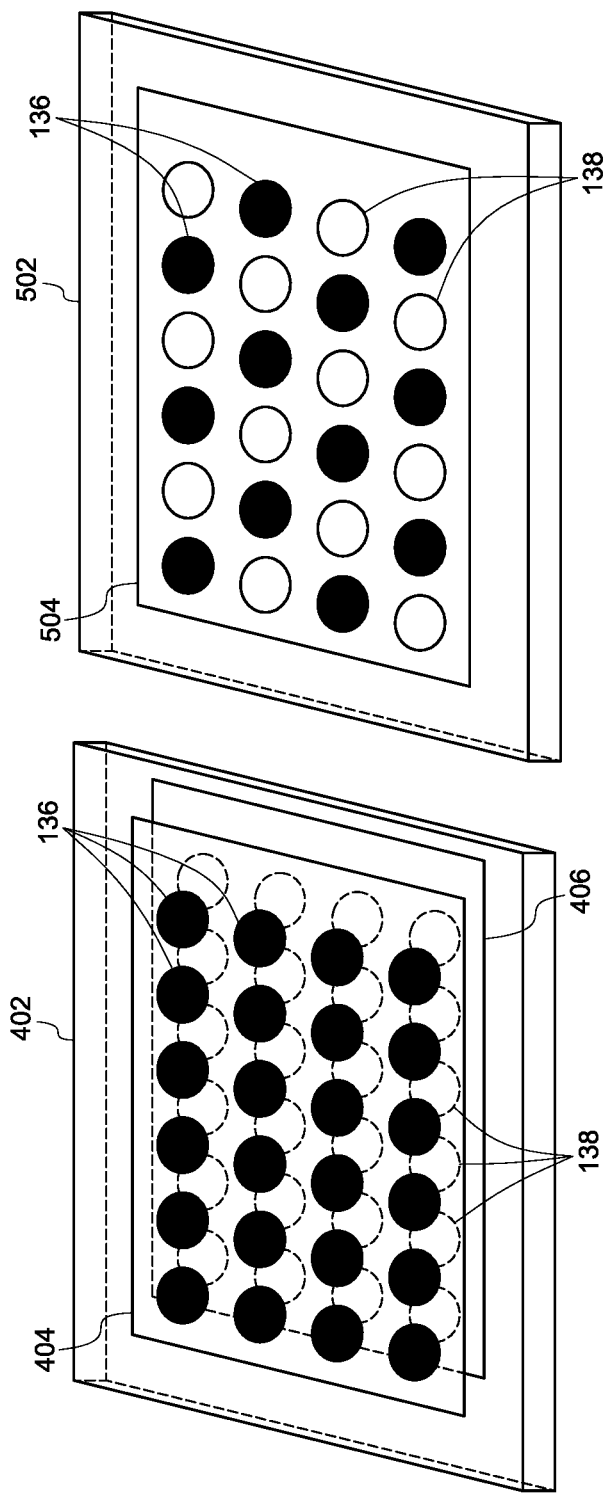

SYSTEM AND METHOD FOR CHARGING RECEIVER DEVICES

CROSS-REFERENCE TO RELATED APPLICATIONS

This application is related to India patent application 201641026650, entitled "SYSTEM AND METHOD FOR CHARGING RECEIVER DEVICES," filed on Aug. 4, 2016.

BACKGROUND OF THE INVENTION

Embodiments of the present invention relate generally to wireless power transfer systems and more particularly to a system and method for charging receiver devices.

In general, power transfer systems are widely used to transfer power from a power source to one or more receiver devices, such as for example, mobile devices, biomedical devices, and portable consumer devices. Typically, the power transfer systems may be contact based power transfer systems or wireless power transfer systems. In certain applications, where instantaneous or continuous power transfer is required but interconnecting wires are inconvenient, the wireless power transfer systems are desirable.

In the wireless power transfer systems, a charging device is used to convert an input power to a transferable power which is further transmitted to charge one or batteries in the receiver devices. However, these receiver devices are compatible with one of the wireless frequency standards. For example, there are currently three competing frequency standards: the Alliance for Wireless Power (A4WP), the Wireless Power Consortium (WPC), and the Power Matters Alliance (PMA). The WPC standard (Qi) is defined in a frequency range of 100 kHz to 200 kHz. The PMA standard is defined in a frequency range of 200 kHz to 400 kHz. Further, the A4WP standard is defined at a frequency of about 7 MHz. A conventional charging device cannot be used to charge the receiver devices operating at different frequency standards.

Thus, there is a need for an improved system and method for charging receiver devices operating at different frequency standards.

BRIEF DESCRIPTION

In accordance with one embodiment of the present invention, a charging pad is disclosed. The charging pad includes at least one first resonator coil operable at a first frequency band. Also, the charging pad includes at least one second resonator coil operable at a second frequency band. Further, the charging pad includes at least one exciter coil magnetically coupled to the at least one first resonator coil and the at least one second resonator coil. In addition, the charging pad includes an excitation unit operationally coupled to the at least one exciter coil and configured to drive the at least one first resonator coil and the at least one second resonator coil via the at least one exciter coil.

In accordance with another embodiment of the present invention, a wireless charging device is disclosed. The wireless charging device includes a charging pad including an excitation unit configured to convert a DC voltage of an input power to at least one of a first AC voltage having a frequency from a first frequency band and a second AC voltage having a frequency from a second frequency band. Also, the charging pad includes a transmitting unit operatively coupled to the excitation unit, wherein the transmitting unit comprises at least one exciter coil electrically coupled to the excitation unit, at least one first resonator coil magnetically coupled to the at least one exciter coil and configured to transmit the first AC voltage having the frequency from the first frequency band, and at least one second resonator coil magnetically coupled to the at least one exciter coil and configured to transmit the second AC voltage having the frequency from the second frequency band. In addition, the wireless charging device includes a control unit coupled to the excitation unit and configured to feed at least one of a first frequency control signal and a second frequency control signal to the excitation unit.

In accordance with another embodiment of the present invention, a method for charging one or more receiver devices is disclosed. The method includes receiving, by an excitation unit, at least one of a first frequency control signal and a second frequency control signal. Also, the method includes converting, by the excitation unit, a DC voltage of an input power to a first AC voltage having a frequency from a first frequency band if the first frequency control signal is received. Further, the method includes converting, by the excitation unit, the DC voltage of the input power to a second AC voltage having a frequency from a second frequency band if the second frequency control signal is received. Additionally, the method includes driving at least one first resonator coil via at least one exciter coil to transmit the first AC voltage having the frequency from the first frequency band to a first receiver device. Furthermore, the method includes driving at least one second resonator coil via the at least one exciter coil to transmit the second AC voltage having the frequency from the second frequency band to a second receiver device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 is a diagrammatic representation of a charging pad having first resonator and second resonator coils;

FIG. 5 is a diagrammatic representation of a charging pad having first resonator and second resonator coils;

DETAILED DESCRIPTION

As will be described in detail hereinafter, various embodiments of a system and method for charging one or more wireless receiver devices are disclosed. In particular, the system and method disclosed herein employ an excitation unit that is capable of driving first resonator and second resonator coils enabling charging of the wireless receiver devices designed based on different frequency standards.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "controlling unit" may include either a single component or a plurality of components, which are either active and/or passive and are connected or otherwise coupled together to provide the described function. In addition, the term operationally coupled as used herein includes wired coupling, wireless coupling, electrical coupling, magnetic coupling, radio communication, software based communication, or combinations thereof.

Figure 1:
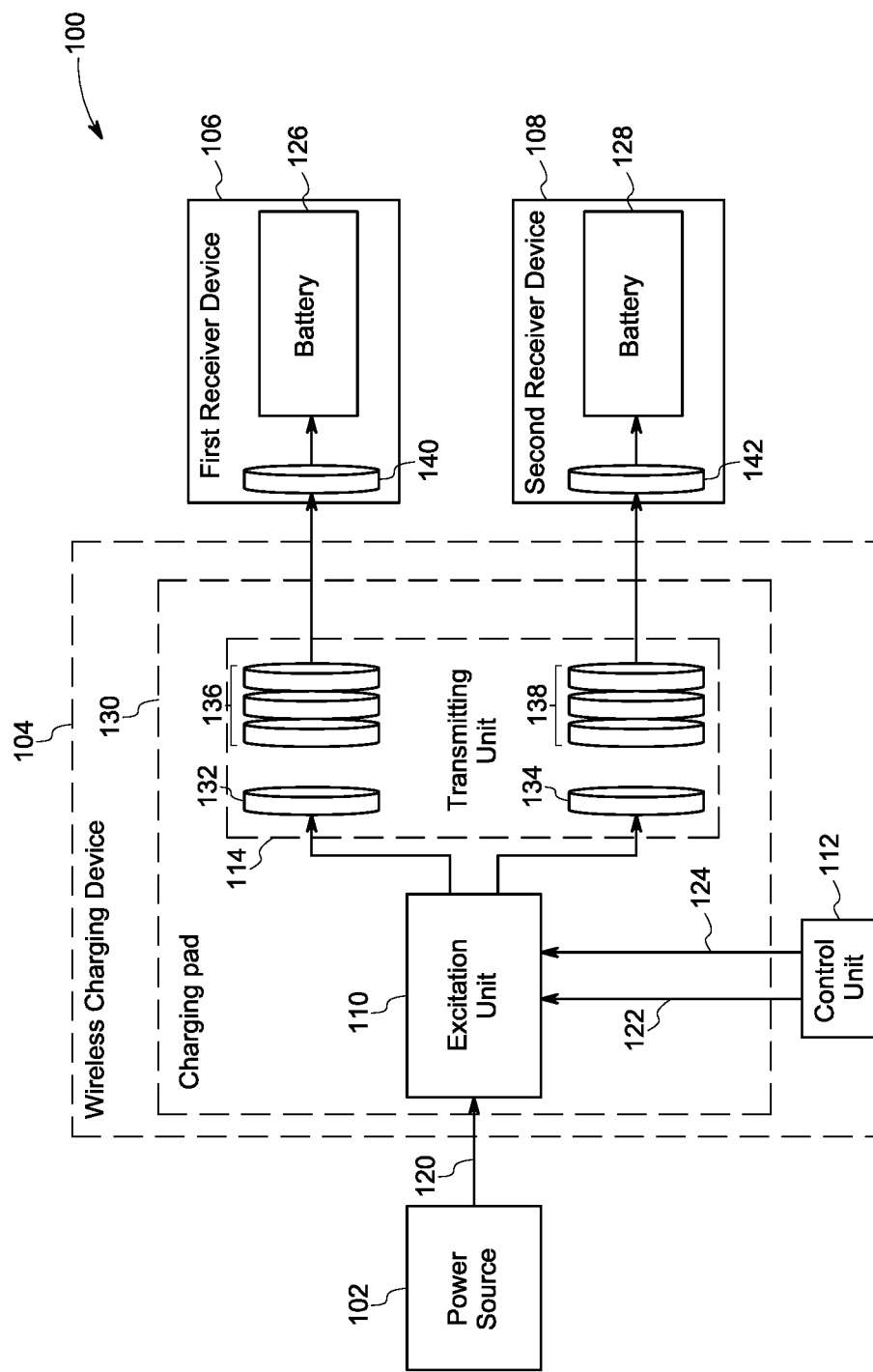
FIG. 1 is a block diagram representation of a wireless power transfer system.

FIG. 1 is a diagrammatical representation of a wireless power transfer system 100 in accordance with an embodiment of the present invention. The wireless power transfer system 100 is used to transmit an electrical power from a power source 102 to one or more receiver devices such as mobile devices, biomedical devices, and portable consumer devices. Particularly, in an automobile industry, a vehicle includes one or more charging pads that are used for supplying electrical power from the power source 102 to the mobile devices like cell phones, laptops, heating ventilation and air-conditioning (HVAC) units etc. In one embodiment, the wireless power transfer system 100 may also be referred to as a contactless power transfer system.

In the illustrated embodiment, the wireless power transfer system 100 includes a wireless charging device 104 that is wirelessly coupled to a first receiver device 106 and a second receiver device 108. It may be noted that the wireless power transfer system 100 is not limited to the first receiver device 106 and the second receiver device 108 and may include any number of receiver devices.

The first and second receiver devices 106, 108 may be compatible with one of the wireless frequency standards. For example, one of the receiver devices may be compatible with Alliance for Wireless Power (A4WP) standard that is defined at a frequency of about 7 MHz. Similarly, another receiver device may be compatible with Wireless Power Consortium (WPC) standard (Qi) that is defined in a frequency range of 100 kHz to 200 kHz. One of the receiver devices may be compatible with Power Matters Alliance (PMA) standard that is defined in a frequency range of 200 kHz to 400 kHz. One of the other receiver devices may be compatible with Air Fuel Alliance standard that is defined at a frequency of about 6.7 MHz. For ease of understanding of the embodiment of the invention, the first receiver device 106 is considered to be compatible with a first frequency standard such as Air Fuel Alliance standard defined at a frequency of about 6.7 MHz. The first frequency standard may also be referred to as a high frequency standard. Similarly, the second receiver device 108 is considered to be compatible with a second frequency standard such as WPC standard defined in a frequency range of 100 kHz to 200 kHz. The second frequency standard may also be referred to as a low frequency standard. It may be noted that the receiver devices 106, 108 may be of any frequency standard and are not limited to the frequency standards discussed herein. Also, any number of receiver devices that are compatible with any number of frequency standards may be considered for charging.

In conventional power transfer systems that are compatible with different frequency standards for each of the receiver devices/gadgets, a charging device may not supply power to each of the receiver devices at their corresponding frequency standards. In one of the conventional power transfer systems, separate charging devices having a dedicated converter and dedicated frequency coils for each frequency standard, are employed to supply power to the corresponding receiver device. However, using separate charging devices for each frequency standard may substantially increase set-up cost and maintenance cost of the conventional power transfer systems.

To overcome the above problems/drawbacks associated with conventional systems, the exemplary power transfer system 100 includes the wireless charging device 104 that is configured to charge the first and second receiver devices 106, 108 of any frequency standard. The wireless charging device 104 includes a charging pad 130 and a control unit 112 that are used for supplying electrical power from the power source 102 to the first and second receiver devices 106, 108. The charging pad 130 may be referred to as an electrical enclosure upon which the one or more receiver devices 106, 108 may be placed for charging one or more batteries in the corresponding receiver devices 106, 108. In one embodiment, the control unit 112 may be positioned within the charging pad 130. In another embodiment, the control unit 112 may be positioned external to the charging pad 130. Further, the charging pad 130 includes an excitation unit and a transmitting unit 114. In one embodiment, the excitation unit 110 may include one or more converters (not shown) that are used for providing electrical power at a desired frequency to the first and second receiver devices 106, 108.

The excitation unit 110 is electrically coupled to the power source 102 and the control unit 112. The power source 102 is configured to supply an input power 120 having a DC voltage to the excitation unit 110. In some embodiments, the input power 120 may be in a range from about 1 W to 200 W. In one embodiment, the power source 102 may be a part of the wireless charging device 104. In another embodiment, the power source 102 may be positioned external to the wireless charging device 104.

Furthermore, the excitation unit 110 is configured to receive the input power 120 having the DC voltage from the power source 102. Further, the excitation unit 110 is configured to convert the DC voltage of the input power 120 to a first AC voltage having a frequency in a first frequency band and/or a second AC voltage having a frequency in a second frequency band. It may be noted that the first frequency band may be referred to as a range of frequencies from about 4 MHz to about 9 MHz. In a similar manner, the second frequency band may be referred to as a range of frequencies from about 100 kHz to about 1 MHz. Also, it may be noted that the terms "frequency in a first frequency band" and "first frequency" may be used interchangeably in the below specification. Similarly, the terms "frequency in a second frequency band" and "second frequency" may be used interchangeably in the below specification.

Additionally, the excitation unit 110 is configured to receive a first frequency control signal 122 and/or a second frequency control signal 124 from the control unit 112. If the first frequency control signal 122 is received from the control unit 112, the excitation unit 110 is configured to convert the DC voltage of the input power 120 to the first AC voltage having the first frequency. In a similar manner, if the second frequency control signal 124 is received from the control unit 112, the excitation unit 110 is configured to convert the DC voltage of the input power 120 to the second AC voltage having the second frequency. In one example, the first and second AC voltages may be in a range from about 5 volts to 50 volts. The details pertaining to converting the DC voltage to the first AC voltage or the second AC voltage are explained in greater detail below with reference to FIGS. 2 and 3.

In one embodiment, the control unit 112 is configured to alternately send the first frequency control signal 122 and the second frequency control signal 124 at regular time intervals to the excitation unit 110. In one specific embodiment, the control unit 112 is configured to send a modulation signal including the first frequency control signal 122 and the second frequency control signal 124. In another embodiment, the control unit 112 is configured to concurrently send the first frequency control signal 122 and the second frequency control signal 124 to different sets of switches in the excitation unit 110.

The excitation unit 110 is further configured to transmit the input power having the first AC voltage or the second AC voltage to the transmitting unit 114. The transmitting unit 114 includes one or more exciter coils 132, 134 that are electrically coupled to the excitation unit 110. In addition to the exciter coils 132, 134, the transmitting unit 114 includes one or more first resonator coils 136 and one or more second resonator coils 138. The one or more first resonator coils 136 are magnetically coupled to the exciter coil 132 and a first receiver coil 140 in the first receiver device 106. Similarly, the one or more second resonator coils 138 are magnetically coupled to the exciter coil 134 and a second receiver coil 142 in the second receiver device 108. In one embodiment, the one or more first resonator coils 136 and the one or more second resonator coils 138 may be stacked one above the other. Further, a single exciter coil may be used to drive the one or more first resonator coils 136 and/or the one or more second resonator coils 138. In another embodiment, the one or more first resonator coils 136 and the one or more second resonator coils 138 may be positioned side-by-side on a same plane or on a different plane.

Further, the exciter coils 132, 134 and the one or more first and second resonator coils 136, 138 are used to wirelessly transmit the input power having the first AC voltage or the second AC voltage to the receiver devices 106, 108. Particularly, if the excitation unit 110 converts the DC voltage to the first AC voltage having the first frequency, the exciter coil 132 and the one or more first resonator coils 136 are excited simultaneously to transmit the input power having the first AC voltage to the first receiver coil 140 of the first receiver device 106. In a similar manner, if the excitation unit 110 converts the DC voltage to the second AC voltage having the second frequency, the exciter coil 134 and the one or more second resonator coils 138 are excited simultaneously to transmit the input power having the second AC voltage to the second receiver coil 142 of the second receiver device 108. In an embodiment, the resonator coils 136, 138 in the charging device 104 facilitates in transmitting the power to a longer distance between the receiver devices 106, 108 and the wireless charging device 104. In one embodiment, a distance between the receiver devices 106, 108 and the wireless charging device 104 may be in a range from about 10 mm to about 100 mm.

Further, the first and second receiver devices 106, 108 are configured to use the first AC voltage having the first frequency or the second AC voltage having the second frequency for charging one or more batteries 126, 128 included in the first and second receiver devices 106, 108. In one embodiment, the first and second receiver devices 106, 108 such as mobile phones and laptops may be magnetically coupled to the first resonator coils 136 and/or the second resonator coils 138 based on the frequency standards for which the first and second receiver devices 106, 108 are designed. For example, if the first receiver device 106 is designed to the first frequency standard such as Air Fuel Alliance standard, the first receiver device 106 receives the first AC voltage having the first frequency from the first resonator coils 116. Similarly, if the second receiver device 108 is designed to a second frequency standard such as WPC standard, the second receiver device 108 receives the second AC voltage having the second frequency from the second resonator coils 118. In one example, the first and second receiver devices 106, 108 may be placed on the charging pad 130 for charging the batteries 126, 128 in the first and second receiver devices 106, 108.

Thus, by employing the exemplary wireless power transfer system 100, the single charging device 104 is configured to magnetically transfer power to the first and second receiver devices 106, 108 that are compatible with one or more frequency standards.

Figure 2:
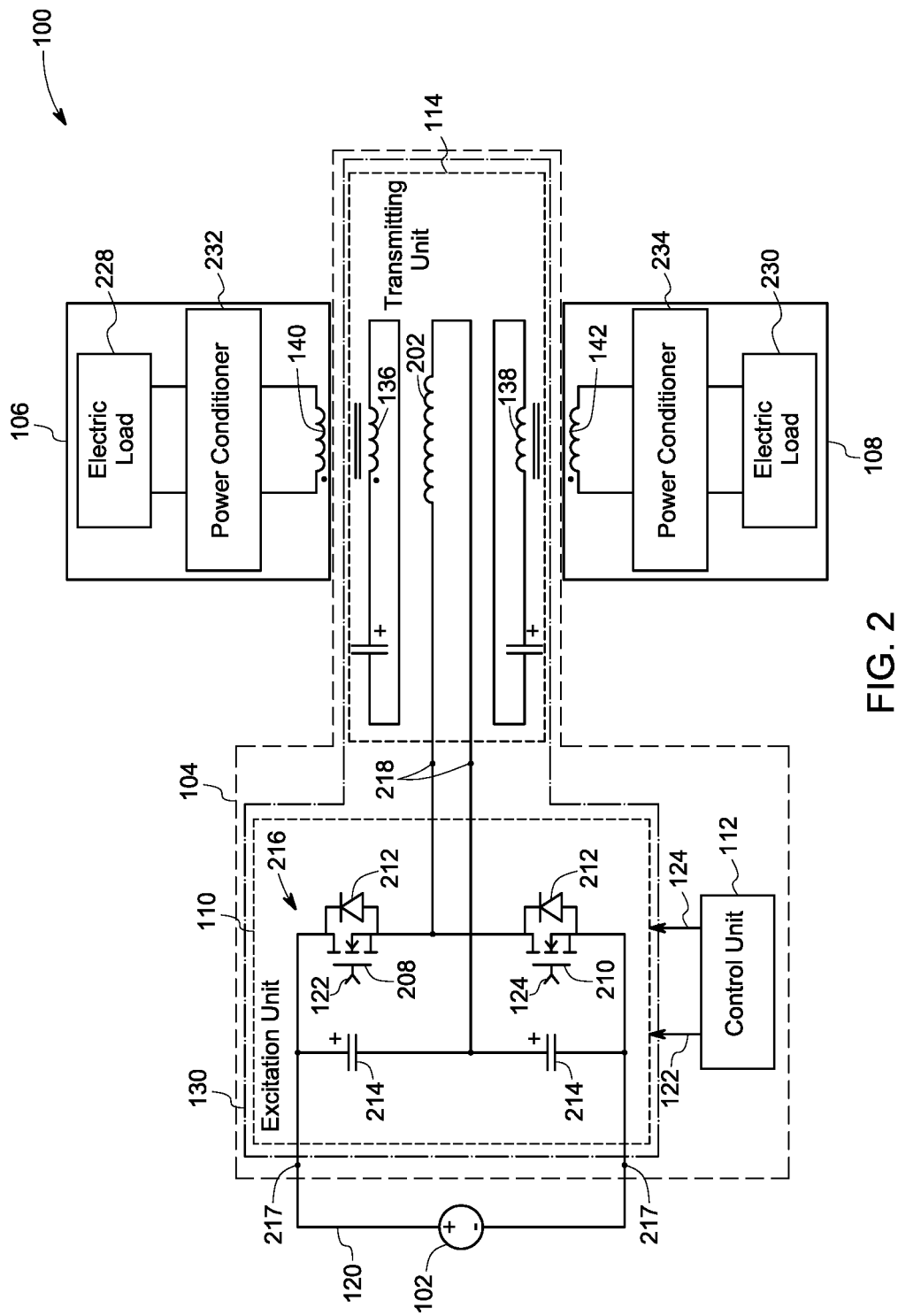
FIG. 2 is a schematic representation of a wireless power transfer system.

Referring to FIG. 2, a schematic representation of the wireless power transfer system 100 in accordance with another embodiment of the present invention is depicted. The wireless power transfer system 100 is used to transmit the input power 120 from the power source 102 to the first and second receiver devices 106, 108.

The wireless power transfer system 100 includes the wireless charging device 104, the first receiver device 106, and the second receiver device 108. The wireless charging device 104 is wirelessly coupled to the first receiver device 106 and the second receiver device 108. The first receiver device 106 and the second receiver device 108 may be compatible with one of the wireless frequency standards.

Further, the wireless charging device 104 includes the charging pad 130 and the control unit 112 that are used for supplying electrical power from the power source 102 to the first and second receiver devices 106, 108. The charging pad 130 includes the excitation unit 110 and the transmitting unit 114. It may be noted that the wireless power transfer system 100 may include other components and is not be limited to the components shown in FIG. 2.

In the illustrated embodiment, the excitation unit 110 includes only a single converter 216 that is electrically coupled to the power source 102 and configured to receive the input power 120 having the DC voltage from the power source 102. The single converter 216 is defined as an electrically connected device that has single DC or line frequency input. It may be noted that the excitation unit 110 may include any number of converters, and is not limited to a single converter as depicted in FIG. 2. Further, the single converter 216 includes a first switch 208, a second switch 210, a plurality of diodes 212, and a plurality of capacitors 214 that are arranged to form a half bridge inverter circuit. The first and second switches 208, 210, the diodes 212, and the capacitors 214 are electrically coupled between input terminals 217 and output terminals 218 of the excitation unit 110. In one embodiment, the switches 208, 210 may include electronic switches such as MOSFETs or IGBTs. It may be noted that the switches 208, 210 may include other semiconductor switches, and is not limited to MOSFETs and IGBTs. Further, the first switch 208 and the second switch 210 are operated complimentary to each other. For example, if the first switch 208 is activated for a time duration $T_{on}$, the second switch 210 is deactivated for this time duration $T_{on}$. Similarly, if the second switch 210 is activated for the time duration $T_{off}$, the first switch 208 is deactivated for this time duration $T_{off}$.

Furthermore, the control unit 112 is configured to alternately and repeatedly send a first frequency control signal 122 and a second frequency control signal 124 to the first switch 208 and the second switch 210. In one embodiment, the control unit 112 may generate the first and second frequency control signals 122, 124 based on change in characteristics of an exciter coil 202. For example, if the first receiver device 106 and/or the second receiver device 108 are placed on the charging pad 130, the characteristics such as electrical current in the exciter coil 202 may change. Further, the change in the characteristics of the exciter coil 202 may be used by the control unit 112 to generate the first and second frequency control signals 122, 124.

Furthermore, the control unit 112 sends the first frequency control signal 122 to the first switch 208 for a first time period. Concurrently, the control unit 112 sends a signal that is complimentary to the first frequency control signal 122 to the second switch 210 for the first time period. In one example, the first frequency control signal 122 may have a high switching pulse frequency of about 7 MHz. During the first time period, the first switch 208 and the second switch 210 are operated complimentary to each other to convert the DC voltage of the input power 120 to the first AC voltage having a first frequency. In one embodiment, the first frequency may be in a range from about 4 MHz to about 9 MHz. In one specific embodiment, the first switch 208 and the second switch 210 are configured to modulate the DC voltage of the input power 120 based on the first frequency control signal 122 to generate the first AC voltage having the first frequency at the output terminals 218 of the excitation unit 110.

In a similar manner, the control unit 112 sends the second frequency control signal 124 to the first switch 208 for a second time period. Concurrently, the control unit 112 sends a signal that is complimentary to the second frequency control signal to the second switch 210 for the second time period. In one embodiment, the second frequency control signal 124 may have a low switching pulse frequency of about 200 kHz. During the second time period, the first switch 208 and the second switch 210 are operated complimentary to each other to convert the DC voltage of the input power 120 to the second AC voltage having a second frequency. In one embodiment, the second frequency may be in a range from about 100 kHz to about 1 MHz. In one embodiment, the first switch 208 and the second switch 210 are configured to modulate the DC voltage of the input power 120 based on the second frequency control signal 124 to provide the second AC voltage having the second frequency at the output terminals 218 of the excitation unit 110.

Further, the input power having the first AC voltage or the second AC voltage is transmitted from the excitation unit 110 to the transmitting unit 114. The transmitting unit 114 includes an exciter coil 202 that is electrically coupled to the output terminals 218 of the excitation unit 110. It may be noted that the exciter coil 202 may be similar to one of the exciter coils 132, 134 shown in FIG. 1. Further, the transmitting unit 114 includes the one or more first resonator coils 136 and one or more second resonator coils 138. For ease of illustration, only one first resonator coil 136 and one second resonator coil 138 are shown. The first resonator coil 136 is magnetically coupled to the exciter coil 202 and the first receiver coil 140 in the first receiver device 106. The first resonator coil 136 and the exciter coil 202 are used to transfer the power having the first AC voltage to the first receiver coil 140 in the first receiver device 106. Further, the power having the first AC voltage is then transmitted from the first receiver coil 140 to an electric load 228 such as a battery in the first receiver device 106 via a power conditioner 232.

In a similar manner, the second resonator coil 138 is magnetically coupled to the exciter coil 202 and the second receiver coil 142 in the second receiver device 108. The second resonator coil 138 and the exciter coil 202 are used to transfer the power having the second AC voltage to the second receiver coil 142 in the second receiver device 108. Further, the power having the second AC voltage is then transmitted from the second receiver coil 142 to an electric load 230 such as a battery in the second receiver device 108 via a power conditioner 234. In another embodiment, the transmitting unit 112 may include two exciter coils, where one exciter coil is magnetically coupled to the first resonator coils 136, while the other exciter coil is magnetically coupled to the second resonator coils 138.

During normal operation of the wireless power transfer system 100, the control unit 112 is configured to periodically and/or alternately send the first frequency control signal 122 and the second frequency control signal 124 to the excitation unit 110. Particularly, the control unit 112 sends the first frequency control signal 122 to the first switch 208 and a signal that is complimentary to the first frequency control signal 122 to the second switch 210 for the first time period. Further, during the first time period, the first switch 208 and the second switch 210 toggles between ON state and OFF state based on switching pulse of the first frequency control signal 122 to convert the DC voltage of the input power to the corresponding first AC voltage having the first frequency. It may be noted that the ON state may be referred to as a state where the switches 208, 210 are activated. The OFF state may be referred to as a state where the switches 208, 210 are deactivated.

Further, the input power having the first AC voltage may be used to excite the exciter coil 202 and the first resonator coil 136 simultaneously. Particularly, the exciter coil 202 may generate a magnetic field that is corresponding to the first AC voltage. Further, the generated magnetic field may be focused towards the first receiver coil 140 via the first resonator coil 136. In one embodiment, the first resonator coil 136 and one or more capacitors may be used to enhance the magnetic field generated by the exciter coil 202. Subsequently, the first receiver coil 140 is configured to receive the enhanced magnetic field and convert the enhanced magnetic field to the input power having the first AC voltage. In one embodiment, the first resonator coil 136 is used to enhance the magnetic coupling between the exciter coil 202 and the first receiver coil 140. The first receiver coil 140 transmits the first AC voltage having the first frequency to the electric load 228 via the power conditioner 232.

Furthermore, at the end of the first time period, the control unit 112 sends the second frequency control signal 122 to the first switch 208 and a signal that is complimentary to the first frequency control signal 122 to the second switch 210 for the second time period. Further, during the second time period, the first switch 208 and the second switch 210 toggles between ON state and OFF state based on switching pulse of the second frequency control signal 124 to convert the DC voltage of the input power to the corresponding second AC voltage having the second frequency.

Further, the input power having the second AC voltage 110 may be used to excite the exciter coil 202 and the second resonator coil 138 simultaneously. Particularly, the exciter coil 202 may generate a magnetic field that is corresponding to the second AC voltage. Further, the generated magnetic field may be focused towards the second receiver coil 142 via the second resonator coil 138. In one embodiment, the second resonator coil 138 and one or more capacitors may be used to enhance the magnetic field generated by the exciter coil 202. Subsequently, the second receiver coil 142 is configured to receive the enhanced magnetic field and convert the enhanced magnetic field to the input power having the second AC voltage. In one embodiment, the second resonator coil 138 is used to enhance the magnetic coupling between the exciter coil 202 and the second receiver coil 142. Thereafter, the second receiver coil 142 transmits the second AC voltage having the second frequency to the electric load 230 via the power conditioner 234. In one embodiment, the control unit 112 alternately sends the first frequency control signal 122 and the second frequency control signal 124 to the excitation unit 110 to transmit the first AC voltage having the first frequency and the second AC voltage having the second frequency to the corresponding receiver devices 106, 108.

In the exemplary power transfer system 100, the excitation unit 110 drives both the first resonator coil 136 and the second resonator coil 138 to transfer the power from the power source 102 to the receiver devices 106, 108 of different frequency standards.

Figure 3:
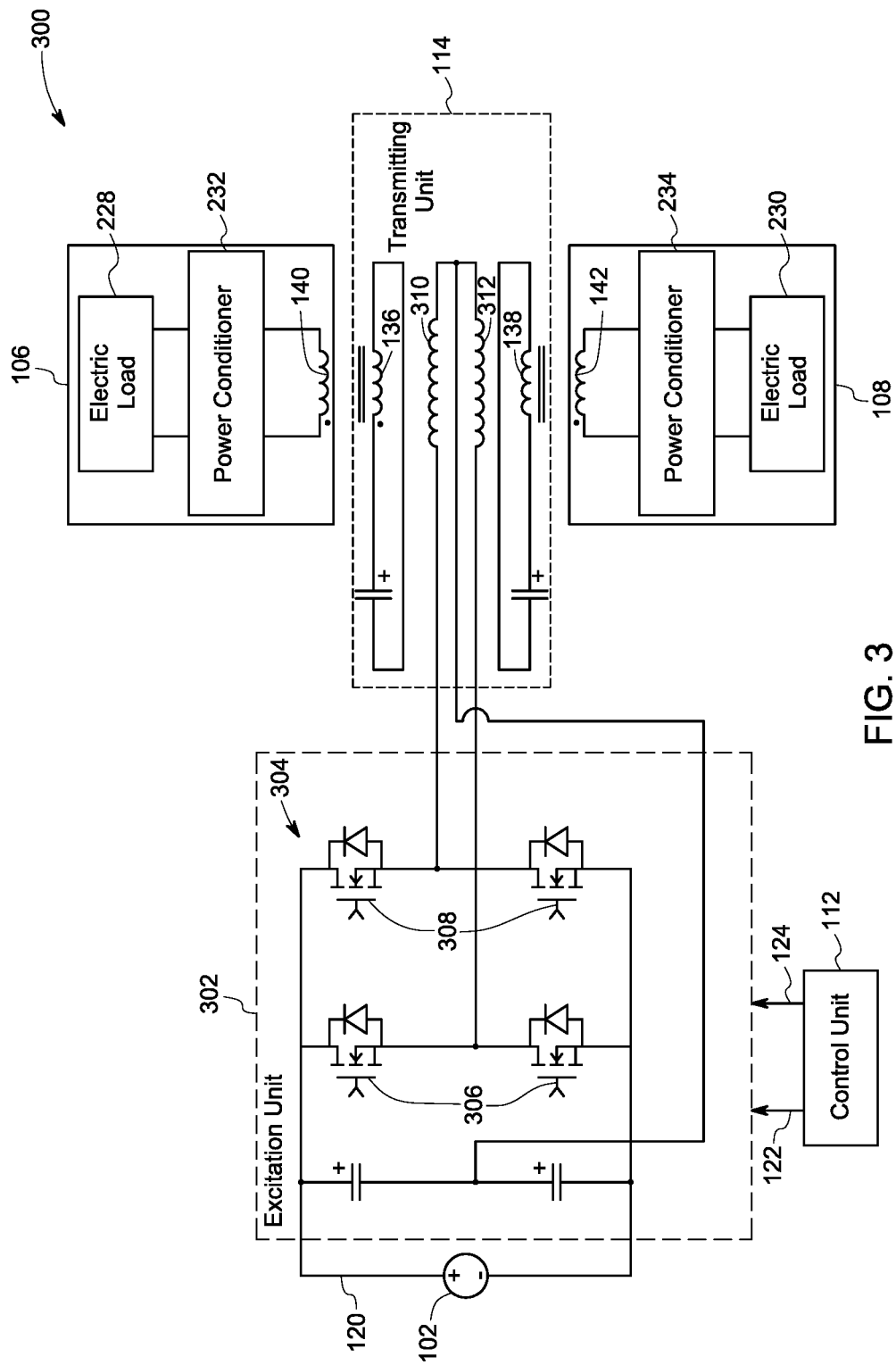
FIG. 3 is a schematic representation of a wireless power transfer system.

Referring to FIG. 3, a schematic representation of a wireless power transfer system 300 in accordance with another embodiment of the present invention is depicted. The wireless power transfer system 300 of FIG. 3 is similar to the wireless power transfer system 100 of FIG. 2 except that the excitation unit 302 includes a single converter 304 having a full bridge inverter circuit and the transmitting unit 114 includes a first exciter coil 310 and a second exciter 312. Particularly, the single converter 304 includes a first leg of switches 306 and a second leg of switches 308. The first leg of switches 306 is configured to receive a first frequency control signal 122 from the control unit 112 and the second leg of switches 308 is configured to receive a second frequency control signal 124 from the control unit 112. In this embodiment, the first frequency control signal 122 is a continuous signal having a high switching pulse frequency of about 6.7 MHz and the second frequency control signal 124 is a continuous signal having a low switching pulse frequency of about 200 kHz.

The first leg of switches 306 is activated if the first frequency control signal 122 is received. Further, the first leg of switches 306 is configured to convert a DC voltage of the input power 120 to a first AC voltage having a first frequency. In one embodiment, this first frequency may be in a range from about 4 MHz to about 9 MHz. The first AC voltage having the first frequency is transmitted to the first exciter coil 310, which in turn magnetically transfers the power having the first AC voltage to the first receiver device 106 via the first resonator coil 136. In one embodiment, the first resonator coil 136 enhances the power having the first AC voltage so that the first receiver device 106 may receive the power without or negligible power loss.

In a similar manner, the second leg of switches 308 is activated if the second frequency control signal 124 is received. Further, the second leg of switches 308 is configured to convert the DC voltage of the input power 120 to a second AC voltage having a second frequency. In one embodiment, the second frequency may be in a range from about 100 kHz to about 1 MHz. The second AC voltage having the second frequency is transmitted to the second exciter coil 312, which in turn magnetically transfers the power having the second AC voltage to the second receiver device 108 via the second resonator coil 138. In one embodiment, the second resonator coil 138 enhances the power having the second AC voltage so that the second receiver device 108 may receive this power without or negligible power loss.

Referring to FIG. 4, a schematic representation of a charging pad 402 in accordance with an exemplary embodiment is depicted. The charging pad 402 may be similar to the charging pad 130 of FIG. 1. Further, the charging pad 402 includes the one or more first resonator coils 136 and the one or more second resonator coils 138. Particularly, the charging pad 402 includes a first layer 404 having the one or more first resonator coils 136 and a second layer 406 having the one or more second resonator coils 138. The first and second layers 404, 406 may be referred to as electrical carrier having one or more frequency coils. The first layer 404 and the second layer 406 are positioned proximate to each other in the charging pad 402. In one embodiment, the first layer 404 may include a plurality of first resonator coils 136 that are arranged in parallel configuration and/or serial configuration. Similarly, the second layer 406 may include a plurality of second resonator coils 138 that are arranged in parallel configuration and/or serial configuration. In one another embodiment, the charging pad 402 may also include the excitation unit 110 that is capable of independently driving the one or more first resonator coils 136 and/or the one or more second resonator coils 138 via the corresponding exciter coils 132, 134.

The one or more first frequency coils 116 and the one or more second frequency coils 118 are stacked one above the other within the charging pad 402. The receiver devices are placed at a predefined location on a top surface of the charging pad 402 in such a way that the one or more first frequency coils 116 and the one or more second frequency coils 118 are disposed below the predefined location, within the charging pad 402. The excitation unit 110 drives the one or more first frequency coils 116 and/or the one or more second frequency coils 118 based on the frequency standard of the receiver devices.

Referring to FIG. 5, a schematic representation of a charging pad 502 in accordance with another embodiment is depicted. The charging pad 502 includes a single layer 504 having the one or more first resonator coils 136 and the one or more second resonator coils 138. Particularly, the first resonator coils 136 and the second resonator coils 138 are alternately positioned in the single layer 504 of the charging pad 502. In one embodiment, the one or more first resonator coils 136 and the one or more second resonator coils 138 are embedded within the charging pad 502. In one another embodiment, the first resonator coils 136 and/or the second resonator coils 138 may be an array of coils arranged in one or more desired patterns. The single layer 504 may be referred to as an electrical carrier having different frequency coils.

Figure 6:
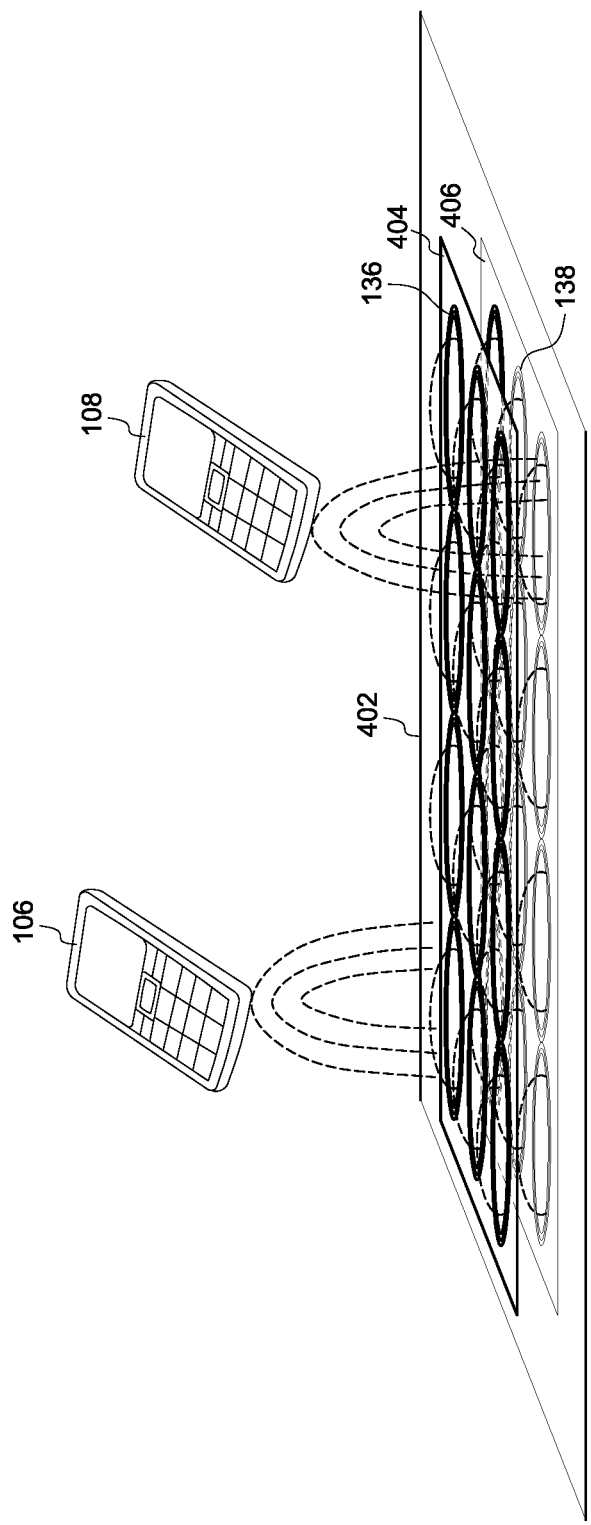
FIG. 6 is a diagrammatic representation of a charging pad having first resonator and second resonator coils magnetically coupled to receiver devices.
Figure 7:
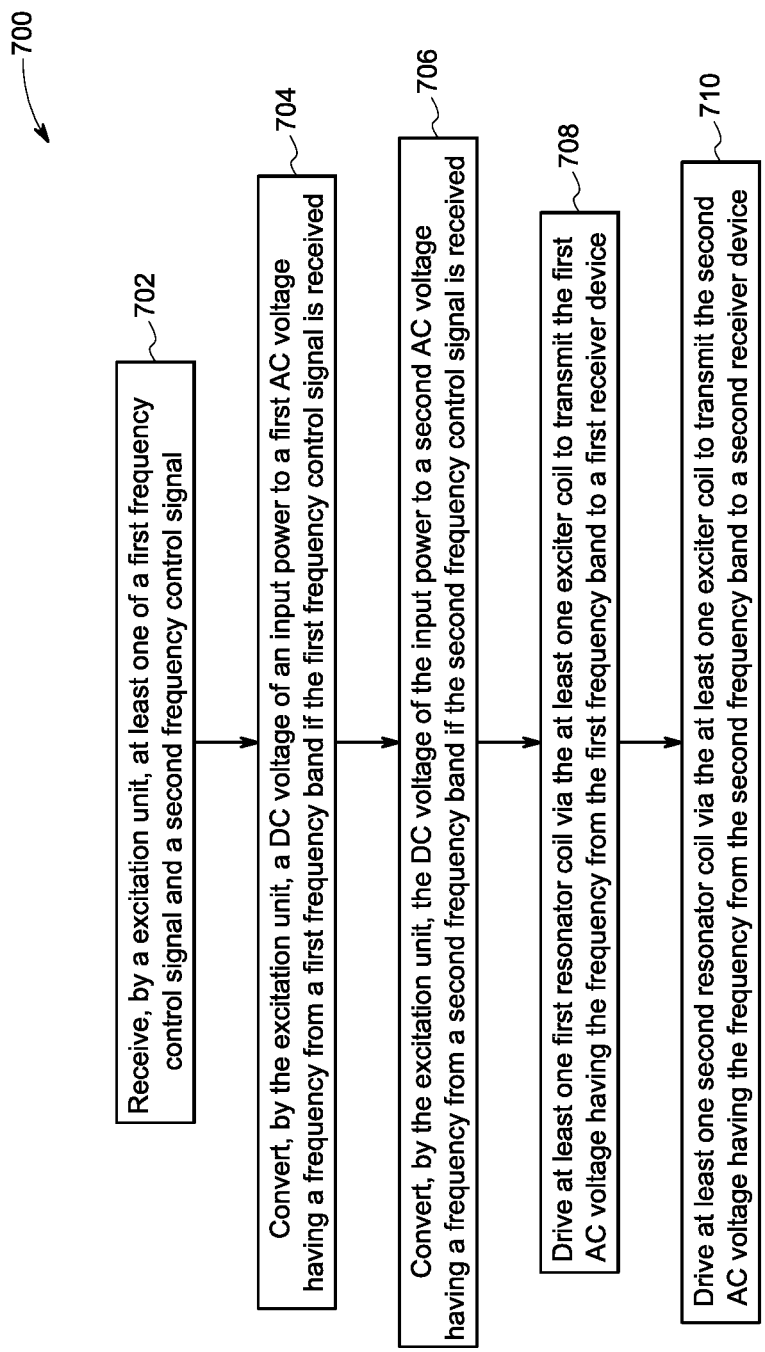
FIG. 7 is a flow chart illustrating a method for charging a plurality of receiver devices.

Referring to FIG. 6, a schematic representation of the charging pad 402 in accordance with an exemplary embodiment is depicted. The charging pad 402 includes a first layer 404 having the one or more first resonator coils 136 and a second layer 406 having the one or more second resonator coils 138. Further, the first resonator coils 136 are magnetically coupled to the first receiver device 106 and the second resonator coils 138 are magnetically coupled to the second receiver device 108. In one embodiment, the charging pad 402 includes a surface upon which the first and second receiver devices are positioned. In another embodiment, the one of more first resonator coils 136 and the one or more second resonator coils 138 may be positioned side-by-side on a same plane or on a different plane Referring to FIG. 7, a flow chart illustrating a method for charging a plurality of receiver devices in accordance with an embodiment of the present invention is depicted. The method 700 is described with reference to FIGS. 1 and 2. At step 702, an excitation unit 110 receives at least one of the first frequency control signal 122 and the second frequency control signal 124 from the control unit 112. Particularly, the control unit 112 sends the first frequency control signal 122 and the second frequency control signal 124 alternately and repeatedly to the excitation unit 110. The power source 102 supplies the input power 120 having the DC voltage to the excitation unit 110.

Subsequently, at step 704, the excitation unit 110 converts the DC voltage of the input power 120 to the first AC voltage having a first frequency if the first frequency control signal 122 is received. Particularly, the control unit 112 sends the first frequency control signal 122 to the first switch 208 and a signal that is complimentary to the first frequency control signal 122 to the second switch 210 for the first time period. Further, during this first time period, the first switch 208 and the second switch 210 in the excitation unit 110 toggles between ON state and OFF state based on switching pulse of the first frequency control signal 122 to convert the DC voltage of the input power to the corresponding first AC voltage having the first frequency. In one embodiment, the first frequency may be in a range from about 4 MHz to about 9 MHz.

Furthermore, at step 706, the excitation unit 110 converts the DC voltage of the input power to the second AC voltage having a second frequency if the second frequency control signal 124 is received. Particularly, the control unit 112 may send the second frequency control signal 122 to the first switch 208 and a signal that is complimentary to the first frequency control signal 122 to the second switch 210 for the second time period. Further, during this second time period, the first switch 208 and the second switch 210 in the excitation unit 110 toggles between ON state and OFF state based on switching pulse of the second frequency control signal 124 to convert the DC voltage of the input power to the corresponding second AC voltage having the second frequency. In one embodiment, the second frequency may be in a range from about 100 kHz to about 1 MHz.

At step 708, the single converter 110 drives the at least one first resonator coil 136 via the at least one exciter coil 132 to transmit the first AC voltage having the frequency from the first frequency band to a first receiver device 106. Particularly, the at least one first resonator coil 136 enhances the power having the first AC voltage so that the first receiver coil 140 may receiver this power without any power loss. Further, the first AC voltage is conditioned by the power conditioner 232 and supplied to the load 230 such as a battery in the first receiver device 106.

Furthermore, at step 710, the excitation unit 110 drives the at least one second resonator coil 138 via the at least one exciter coil 134 to transmit the second AC voltage having the frequency from the second frequency band to a second receiver device 108. Particularly, the at least one second resonator coil 138 enhances the power having the second AC voltage so that the second receiver coil 142 may receiver this power without any power loss. Further, the second AC voltage is conditioned by the power conditioner 234 and supplied to the load 230 such as a battery in the second receiver device 108.

In accordance with the exemplary embodiments discussed herein, the exemplary system and method facilitate to charge the receiver devices of any frequency standard, using the excitation unit 110.

Figure 8:
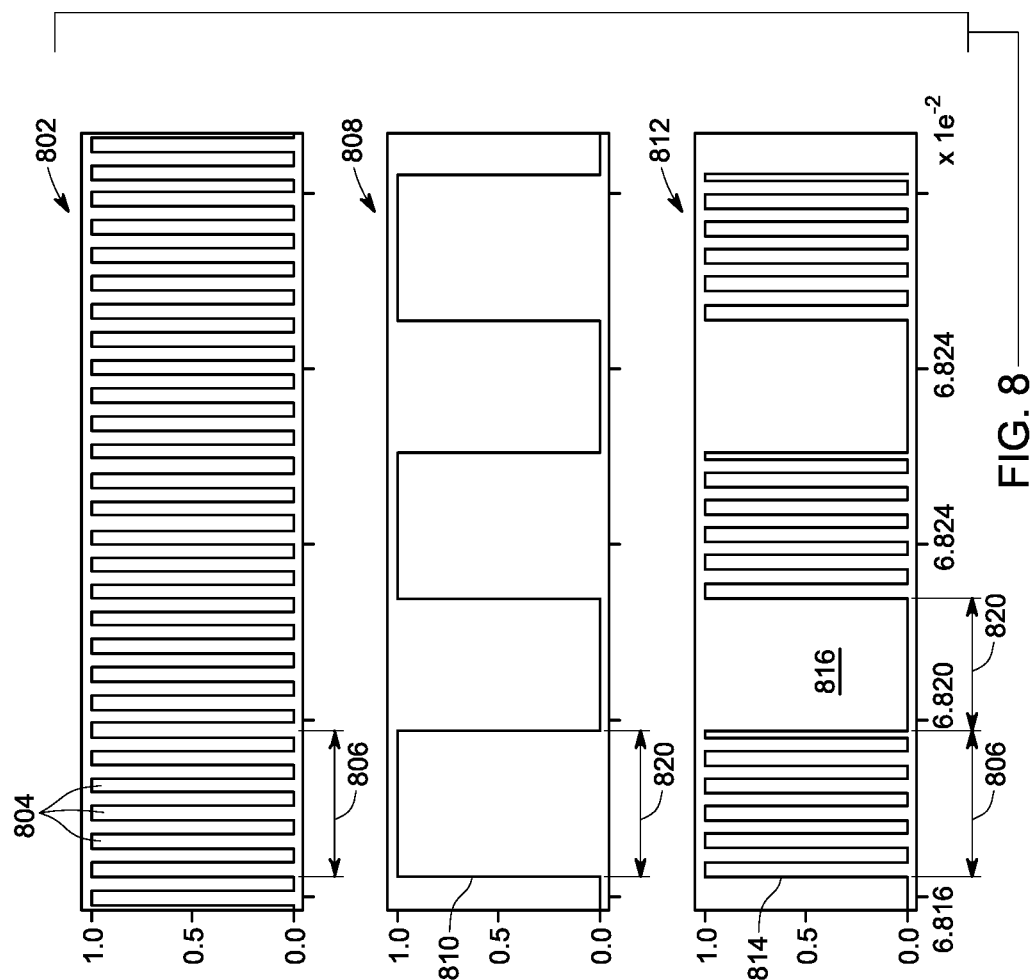
FIG. 8 is a graphical representation of different control signals.

Referring to FIG. 8, a graphical representation of different control signals in accordance with aspects of the present invention is shown. Reference numeral 802 is representative of a first frequency control signal transmitted from the control unit to the excitation unit for converting the DC voltage of the input power to the first AC voltage. The first frequency control signal 802 includes a plurality of switching pulses 804 during a first time period represented by 806. Further, reference numeral 808 is representative of a second frequency control signal transmitted from the control unit to the excitation unit for converting the DC voltage of the input power to the second AC voltage. The second frequency control signal 808 includes a single switching pulse 810 during a second time period represented by 820. It should be noted herein that the second frequency control signal 808 includes more number of switching pulses within the second time period 820. However, the number of switching pulses of the second frequency control signal 808 within the second time period 820 is less than the number of switching pulses for the first frequency control signal 802 within the first time period 806. Reference numeral 812 is representative of a modulation signal which includes the first frequency control signal 814 and the second frequency control signal 816. Particularly, the first frequency control signal 814 is generated during the first time period 806 and the second frequency control signal 816 is generated during the second time period 820.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wireless power transmitting apparatus comprising:
  a first resonator coil operable to wirelessly transmit an AC voltage at-a first frequency within a first frequency band;
  a second resonator coil operable to wirelessly transmit the AC voltage at a second frequency within a second frequency band;
  a common exciter coil magnetically coupled to both the first resonator coil and the second resonator coil, the common exciter coil capable of providing the AC voltage to the first resonator coil at the first frequency and capable of providing the AC voltage to the second resonator coil at the second frequency;

an excitation unit that includes output terminals electrically coupled to the common exciter coil, the excitation unit configured to:
  convert a DC voltage of an input power to the AC voltage having the first frequency within the first frequency band or the second frequency within the second frequency band, and drive the common exciter coil via the output terminals; and
a control unit configured to feed at least one of a first frequency control signal and a second frequency control signal to the excitation unit to selectively cause the first resonator coil to wirelessly transmit the AC voltage or the second resonator coil to wirelessly transmit the AC voltage.

2. The wireless power transmitting apparatus of claim 1, wherein the excitation unit is further configured to:
  receive at least one of the first frequency control signal and the second frequency control signal from the control unit;
  convert the DC voltage to the AC voltage at the first frequency when the first frequency control signal is received; and
  convert the DC voltage to the AC voltage at the second frequency when the second frequency control signal is received.

3. The wireless power transmitting apparatus of claim 2, wherein the excitation unit is further configured to drive the first resonator coil via the common exciter coil to transfer the AC voltage at the first frequency during a first time period, and
  wherein the excitation unit is further configured to drive the second resonator coil via the common exciter coil to transfer the AC voltage at the second frequency during a second time period.

4. The wireless power transmitting apparatus of claim 1, further comprising:
  a charging pad in which the first resonator coil is in a first layer and the second resonator coil is in a second layer.

5. The wireless power transmitting apparatus of claim 1, further comprising a charging pad in which the first resonator coil and the second resonator coil are in a single layer.

6. The wireless power transmitting apparatus of claim 1, wherein the excitation unit comprises a single converter that is configured to selectively drive the first resonator coil and the second resonator coil via the common exciter coil based on the first frequency control signal and the second frequency control signal, respectively.

7. The wireless power transmitting apparatus of claim 1, wherein the first resonator coil and the second resonator coil are stacked one above the other.

8. The wireless power transmitting apparatus of claim 1, wherein the excitation unit is part of a charging pad capable of wirelessly charging wireless power receivers using different frequency standards.

9. The wireless-power transmitting apparatus of claim 1, wherein the control unit is further configured to feed a modulation signal that alternates between the first frequency control signal and the second frequency control signal.

10. The wireless power transmitting apparatus of claim 1, wherein the excitation unit is further configured to drive the first resonator coil via the common exciter coil to transmit the AC voltage at the first frequency within the first frequency band to a first class of receiver devices.

11. The wireless power transmitting apparatus of claim 10, wherein the excitation unit is further configured to drive the second resonator coil via the common exciter coil to transmit the AC voltage at the second frequency within the second frequency band to a second class of receiver devices.

12. The wireless power transmitting apparatus of claim 1, wherein the excitation unit includes a first set of switches and a second set of switches, and wherein the control unit is further configured to concurrently feed the first frequency control signal and the second frequency control signal to the first set of switches and the second set of switches, respectively, to cause the first resonator coil to wirelessly transmit the AC voltage at the first frequency to a first receiver device and cause the second resonator coil to wirelessly transmit the AC voltage at the second frequency to a second receiver device.

13. The wireless power transmitting apparatus of claim 1, wherein the common exciter coil is magnetically coupled to both the first resonator coil and the second resonator coil.

14. A method comprising:
  receiving, by an excitation unit, at least one of a first frequency control signal and a second frequency control signal from a control unit;
  converting, by the excitation unit, a DC voltage of an input power to a first AC voltage at a first frequency within a first frequency band in response to receiving the first frequency control signal from the control unit;
  converting, by the excitation unit, the DC voltage of the input power to a second AC voltage at a second frequency within a second frequency band in response to the second frequency control signal is received from the control unit; and
  outputting, via an output terminal of the excitation unit, the first AC voltage at the first frequency or the second AC voltage at the second frequency to a common exciter coil of a transmitting unit,
    wherein the common exciter coil is magnetically coupled to a first resonator coil operable to wirelessly transmit the first AC voltage at the first frequency and a second resonator coil operable to wirelessly transmit the second AC voltage at the second frequency,
    wherein outputting the first AC voltage at the first frequency includes driving the common exciter coil to cause the first resonator coil to wirelessly transmit the first AC voltage at the first frequency, and
    wherein outputting the second AC voltage includes driving the common exciter coil to cause the second resonator coil to wirelessly transmit the second AC voltage at the second frequency.

15. The method of claim 14, further comprising:
  sending, by a control unit, at least one of the first frequency control signal and the second frequency control signal to the excitation unit; and
  supplying, by a power source, the input power having the DC voltage to the excitation unit.

16. The method of claim 15, further comprising:
  driving, by the excitation unit, the common exciter coil to cause the first resonator coil to wireless transmit the first AC voltage at the first frequency when the first frequency control signal is received from the control unit; and
  driving, by the excitation unit, the common exciter coil to cause the second resonator coil to wireless transmit the second AC voltage at the second frequency when the second frequency control signal is received from the control unit.

17. The method of claim 14, wherein the excitation unit is configured to drive the first resonator coil via the common exciter coil to transfer the first AC voltage at the first frequency during a first time period, and wherein the excitation unit is configured to drive the second resonator coil via the common exciter coil to transfer the second AC voltage at the second frequency during a second time period.

18. The method of claim 14, further wherein receiving the at least one of the first frequency control signal and the second frequency control signal includes:
   receiving a modulation signal that alternates between the first frequency control signal and the second frequency control signal.

19. The method of claim 14, wherein the excitation unit includes a first set of switches and a second set of switches, the method further comprising:
   concurrently receiving the first frequency control signal and the second frequency control signal and using the first frequency control signal and the second frequency control signal to control the first set of switches and the second set of switches, respectively;
   causing the first resonator coil to wirelessly transmit the first AC voltage at the first frequency to a first receiver device; and
   causing the second resonator coil to wirelessly transmit the second AC voltage at the second frequency to a second receiver device.

* * * * *